United States Patent Office
3,313,692
Patented Apr. 11, 1967

3,313,692
METHOD OF INDUCING CALMING AND MUSCLE RELAXATION WITH CARBAMATES
Charles D. Bossinger, Kankakee, and Kelley G. Taylor, Decatur, Ill., assignors, by mesne assignments, to Armour Pharmaceutical Company, a corporation of Delaware
No Drawing. Filed Apr. 21, 1958, Ser. No. 729,554
3 Claims. (Cl. 167—65)

This application is a continuation-in-part of our Ser. No. 554,132, filed Dec. 20, 1955, now abandoned.

This invention relates to improved central nervous system treatment, and more particularly to central nervous system treatment in which there is obtained a substantial absence of central cholinergic action.

It is an object of this invention to provide improved central nervous system treatment in which central cholinergic action is minimized or eliminated. Another object is to provide improved central nervous system treatment in which there is obtained sedation or calming without cortical depressing effect, skeletal muscle relaxation without hypnosis, suppression of sympathetic hyperactivity, and anticonvulsive action as demonstratd by electroshock protection against metrazol and strychnine at therapeutic levels with minimal undesirable side effects. A further object is to provide improved central nervous system treatment in which there is also obtained an antipyretic analgesic action. Still another object is to provide improved central nervous system treatment in which there is concomitantly obtained controlled stimulation of corticotropin release by the pituitary gland which is not substantially affected by the circulating blood level of the adrenal steroids. Still a further object is to provide improved central nervous system treatment in which there is also obtained steroidogenesis and antiphlogistic action. Other objects and advantages will become apparent as the specification proceeds.

The improved central nervous system treatment of this invention involves administering to animals, i.e., mammals and fowls, especially man and domestic animals, at least one compound having the formula

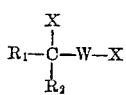

in which W represents an aliphatic radical containing less than 4 carbon atoms, wherein $R_1$ represents an aromatic radical, $R_2$ represents hydrogen or an alkyl radical containing less than 4 carbon atoms, and X represents hydrogen or hydroxy or alkoxy and alkyl radicals containing less than 4 carbon atoms or the radical.

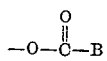

in which B represents an organic amine radical of the group consisting of heterocyclic, ureido and hydrazino radicals and the radical $-N(R_3)_2$ wherein $R_3$ represents hydrogen or an alkyl group containing less than 4 carbon atoms. Moreover, at least one X in the foregoing formula represents the radical

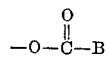

Although any of the compounds represented by the foregoing formula can be employed in the central nervous system treatment of this invention, better results can be achieved with those compounds having the formula

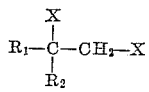

in which $R_1$ represents an aromatic radical, $R_2$ represents hydrogen or an alkyl radical containing less than 4 carbon atoms, and X represents hydrogen or hydroxy or an alkoxy radical containing less than 4 carbon atoms or the radical

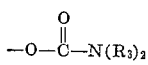

in which $R_3$ represents hydrogen or an alkyl group containing less than 4 carbon atoms.

Although in the foregoing formulae $R_1$ can be any aromatic radical, such as a benzene ring having substituted thereon electron-withdrawing groups, e.g., nitro, carboxyl, sulfonamido, carboxamido, nitryl and quaternary ammonium groups, or electron-donating groups, e.g., amino, methoxy, hydroxy, halogen and alkyl groups, better results are obtained with a chlorophenyl radical, and especially desirable results are achieved with a phenyl radical.

Consequently, a preferred class of compounds for utilization in this central nervous system treatment can be represented by the formula

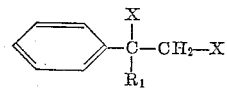

in which $R_1$ represents hydrogen or a methyl radical and X represents hydrogen, hydroxy, methoxy or the radical

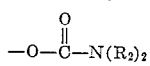

in which $R_2$ represents hydrogen or a methyl group, at least one X in such formula being represented by the radical

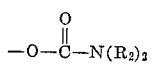

It will be apparent that there are represented by the foregoing formulae a special class of mono and dicarbamate derivatives of aromatic glycols of which are set forth two isomeric forms having the formulae

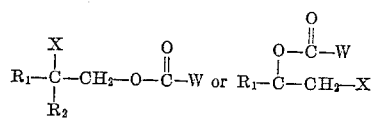

in which X, $R_1$, $R_2$ and W represent the hereinbefore described substituents.

The class of organic carbamate compounds which may be utilized in this central nervous system treatment includes 2-hydroxy-2-phenylethyl carbamate,
N-amino-2-hydroxy-2-phenylethyl carbamate,
N-methyl-2-hydroxy-2-phenylethyl carbamate,
N,N-dimethyl-2-hydroxy-2-phenylethyl carbamate,
2-hydroxy-2-phenylethyl-4-morpholine carboxylate,
N-benzyl-2-hydroxy-2-phenylethyl carbamate,
N-octyl-2-hydroxy-2-phenylethyl carbamate,
N-phenyl-2-hydroxy-2-phenylethyl carbamate,
2-hydroxy-1-phenylethyl-4-morpholine carboxylate,
2-hydroxy-1-phenylethyl carbamate,
N-amino-2-hydroxy-1-phenylethyl carbamate,
N-methyl-2-hydroxy-1-phenylethyl carbamate,
N,N-dimethyl-2-hydroxy-1-phenylethyl carbamate,
N-octyl-2-hydroxy-1-phenylethyl carbamate,
N-benzyl-2-hydroxy-1-phenylethyl carbamate,
N-phenyl-2-hydroxy-1-phenylethyl carbamate,
1-phenylethyl-1,2-dicarbamate,
N,N'-diamino-1-phenylethyl-1,2-dicarbamate,
N-amino-1-phenylethyl-1,2-dicarbamate,
N,N'-dimethyl-1-phenylethyl-1,2-dicarbamate,
N,N'-tetramethyl-1-phenylethyl-1,2-dicarbamate,
N-phenyl-1-phenylethyl-1,2-dicarbamate,
N,N'-diphenyl-1-phenylethyl-1,2-dicarbamate,
N-dimethyl-1-phenylethyl-1,2-dicarbamate,
N-methyl-1-phenylethyl-1,2-dicarbamate,
N-octyl-1-phenylethyl-1,2-dicarbamate,
N,N'-dioctyl-1-phenylethyl-1,2-dicarbamate,
N-benzyl-1-phenylethyl-1,2-dicarbamate and
N,N'-dibenzyl-1-phenylethyl-1,2-dicarbamate.

Also included in this class of compounds are 2-acetoxy-2-phenylethyl carbamate and derivatives thereof, 2-acetoxy-1-phenylethyl carbamate and derivatives thereof, 1-phenylethyl carbamate and derivatives thereof and 2-phenylethyl carbamate and derivatives thereof.

Especially desirable organic carbamate compounds for use in this central nervous system treatment are 2-hydroxy-1-phenylethyl carbamate and its isomer 2-hydroxy-2-phenylethyl carbamate, and 1-phenylethyl carbamate and its isomer 2-phenylethyl carbamate.

In carrying out the central nervous system treatment of this invention, the special organic carbamate compounds may be administered to the animal, especially a human being, orally, as well as parenterally, e.g., by intravenous, subcutaneous or intraperitonal injection. These compounds are well-absorbed orally, and consequently this mode of administration is to be preferred. The administration of such compounds orally may be obtained as a powder, tablet, capsule, solution or suspension. The dosage at which desirable central nervous system treatment is obtained will, of course, vary with the individual compounds and with the species and physiology of the individual to which it is administered.

There may be obtained with certain of these compounds, especially 2-hydroxy-2-phenylethyl carbamate, a highly desirable central nervous system treatment in which there is produced a muscle relaxing action characterized by a flaccid muscular paralysis in the absence of a curariform effect. Also, as mentioned hereinbefore anticonvulsant action can be achieved with certain of these organic carbamate compounds in a central nervous system treatment, which anticonvulsant action is determined by the ability to protect against electroshock, metrazol and strychnine. The special central nervous system treatment obtained with certain of these compounds in which there is demonstrated a corticotropin releasing activity has been determined to be a stimulation of the pituitary gland by reason of the loss of such action after hypophysectomy. Moreover, as contrasted with the conventional sedative-hypnotic agents, the special central nervous system treatment obtained with these compounds involves corticotropin-releasing action which is not affected by the circulating blood level of adrenal steroids. That is, there is a physiological inverse relationship between the blood level of adrenal steroids and the output of corticotropin by the pituitary gland which, although controlling the ability of other CNS agents to produce corticotropin release, is surprisingly non-controlling of the corticotropin releasing action obtained in this central nervous system treatment.

The preparation of the organic carbamate compounds employed in this central nervous system treatment, and the preferred practice of such central nervous system treatment can be further appreciated by reference to the following specific examples:

*Example I*

The following method was utilized in preparing 2-hydroxy-2-phenylethyl carbamate:

A solution of 32.0 gms. (0.3 mole) of phosgene in 200 ml. of benzene was added dropwise to a stirred solution of 44.2 gms. of styrene glycol (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water.

To the benzene-soluble fraction was added 500 ml. of a 30% aqueous ammonium hydroxide solution, and thereafter the resulting mixture was maintained at a temperature of 5° C. for a period of 3 hours. Upon standing, needle-shaped crystals were formed, and such crystals were separated from the mother liquor. Crystallization can be facilitated by the removal of excess ammonia from the crystallization mixture under reduced pressure. The yield of crystals was 30 gms. An additional amount of reaction product was recovered from this mother liquor. The combined yield, after recrystallization from chloroform, was 40.5 gms. The melting point of the reaction product was 111–112° C.

This reaction product was subjected to analysis, and the results were as follows:

Calculated: C, 59.65; H, 6.12; N, 7.73. Analyzed: C, 59.55, 59.75; H, 6.15, 6.17; N, 7.67, 7.54.

*Example II*

2-hydroxy-2-phenylethyl carbamate was prepared by the method of Example I with the exception that chloroform was substituted for benzene as the solvent for the reaction.

*Example III*

2-hydroxy-2-phenylethyl carbamate was prepared according to the method of Example I with the exception that a solution of ammonia in chloroform was substituted for the aqueous ammonia in the amination reaction.

*Example IV*

The following method was utilized in preparing 2-hydroxy-1-phenylethyl carbamate and 2-hydroxy-2-phenylethyl carbamate:

Styrene glycol, in the amount of 100 gms., and propylene carbamate, in the amount of 200 gms., were mixed in a round-bottom flask equipped with a 25 cm. column. The resulting mixture was heated for a period of 3 hours at a bath temperature of 150–160° C. and a pressure of 35 mm.

The reaction system was then heated at a temperature of 150–160° C. at a pressure of 33–38 mm. for a period of 5 hours. During this time a liquid was slowly distilled off having a boiling point of 108° C. at a pressure of 34–35 mm. The pressure of this system was then reduced to 3.5 mm., and the residue fractionally distilled to yield 100 gms. of styrene carbonate having a boiling point of 157° C. at a pressure of 3.5 mm. This product had a melting point of 55–56° C.

This reaction product was subjected to analysis, and the results were as follows:

Calculated: C, 65.84; H, 4.91. Analyzed: C, 65.87, 65.68; H, 5.03, 4.89.

Styrene carbonate, in the amount of 5.0 gms., was mixed with 25 ml. of a concentrated aqueous ammonium hydroxide solution. The resulting mixture was heated for a period of 1 hour on a steam bath, and thereafter the solvent was separated from the reaction product under a stream of air. The separated reaction product was mixed with chloroform, and the resulting mixture distilled to remove chloroform until the last traces of water had been eliminated from the condensate. The residue was crystallized from chloroform. The crystalline reaction product, which was obtained in a yield of 2.0 gms., had a melting point of 112–114° C.

The filtrate separated from the crystalline reaction product was concentrated to dryness and dissolved in ether. The resulting solution was precipitated with Skelly B (petroleum hydrocarbon fraction). This precipitate was recrystallized from chloroform, and the recrystallized product had a melting point of 95–97° C.

The mixed melting point indicates that the recrystallized product was different than the higher melting product. The lower melting product was subjected to spectrophotometric analysis, and its infrared spectrum demonstrated the product to be isomeric 2-hydroxy-1-phenylethyl carbamate.

*Example V*

The following method was utilized in the preparation of 1-phenylethyl carbamate.

A solution of 32.0 gms. (0.3 mole) of phosgene in 200 ml. of benzene was added dropwise to a stirred solution of 39 gms. of phenylmethyl carbinol in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water. To the washed benzene layer was added 500 ml. of a 30% aqueous ammonium hydroxide solution, and the resulting mixture was maintained at a temperature of 5° C. for a period of 3 hours.

The aqueous and benzene layers in this mixture were separated, and each layer concentrated under a reduced pressure. The concentrated benzene portion was found to contain the major concentration of reaction product. This reaction product was crystallized from n-hexane-benzene, and the crystalline substance obtained in a yield of 30.4 gms. having a melting point of 73.5–75° C.

The crystalline substance was subjected to analysis, and the results were as follows:

Calculated: C, 65.45; H, 6.66; N, 8.48. Analyzed: C, 65.45, 65.57; H, 6.87, 6.68; N, 8.40, 8.32.

*Example VI*

The following method was utilized in the preparation of 2-acetoxy-2-phenylethyl carbamate:

2-hydroxy-2-phenylethyl carbamate, in the amount of 20 gms., was dissolved in 100 ml. of pyridine. The resulting solution was cooled in an ice bath to a temperature of 0–5° C. To the cooled solution was added, slowly, 20 ml. of acetyl chloride. The reaction mixture was held at room temperature for a period of 1 hour and the temperature thereupon rose to 15° C.

The warmed reaction mixture was poured over crushed ice, and extracted twice with 500 ml. of chloroform. The combined chloroform extracts were washed with 500 ml. of water, then washed twice with 500 ml. of a 5% hydrochloric acid solution, and finally washed with 500 ml. of water. The washed chloroform solution was dried over anhydrous sodium sulfate, and then the solvent was removed under reduced pressure. The residual oil solidified, and was obtained in a yield of 21 gms. This oil was recrystallized from chloroform-hexane, and the yield of crystalline product was 16.5 gms. having a melting point of 107–9° C. The yield was calculated as 67%.

This reaction product was analyzed, and the results were as follows:

Calculated: C, 59.01; H, 5.88; N, 6.26. Analyzed: C, 58.99, 58.92; H, 5.79, 5.90; N, 6.28, 6.19.

*Example VII*

2-hydroxy-2-phenylethyl-4-morpholine carboxylate was prepared by the following method:

The benzene soluble fraction obtained according to the method of Example I was mixed with 400 ml. of morpholine, and the resulting mixture was maintained at a temperature of 5° C. for a period of 3 hours. This solution was extracted twice with 250 ml. of water. The washed benzene solution was subjected to a reduced pressure to effect removal of the solvent. The resulting product was a brownish color, viscous oil. This oil was distilled at a temperature of 165° C. and a pressure of 75 microns of mercury. The yield of product was 35 gms. This yield was calculated as 47% of theoretical.

This reaction product was subjected to analysis, and the results were as follows:

Calculated: C, 62.55; H, 6.77; N, 5.57. Analyzed: C, 62.11, 62.06; H, 6.93, 7.04; N, 5.60, 5.45.

*Example VIII*

The following method was utilized in the preparation of 2-hydroxy-2-phenylethyl-N-methyl carbamate:

The benzene-soluble fraction obtained according to the method of Example I was mixed with 500 ml. of a 40% aqueous methyl amine solution, and the resulting mixture was maintained at a temperature of 5° C. for a period of 3 hours. Then, the benzene layer was separated from the aqueous layer, and the solvent was removed under reduced pressure. The concentrate obtained from the benzene fraction was distilled to yield 18.6 gms. of reaction product having a melting point of 150° C. at a pressure of 260 microns of mercury. This reaction product was recrystallized from benzene, and obtained in a yield of 10 gms. having a melting point of 85.5–87.5° C.

This reaction product was subjected to analysis, and the results were as follows:

Calculated: C, 61.54; H, 6.67; N, 7.18. Analyzed: C, 61.58, 61.50; H, 6.76, 6.80; N, 6.98, 7.00.

*Example IX*

The following method was utilized in the preparation of 2-hydroxy-2-phenylethyl-N,N-dimethyl carbamate:

The benzene-soluble fraction obtained according to the method of Example I was mixed with 500 ml. of a 40% aqueous dimethyl amine solution, and the resulting mixture was maintained at a temperature of 5° C. for a period of 3 hours. Then, the benzene layer was separated from the aqueous layer, and each layer was concentrated separately under reduced pressure in a steam bath. The major portion of the reaction product was recovered from the benzene layer, and this fraction was distilled to yield 42 gms. of product having a boiling point of 130° C. at a pressure of 150 microns of mercury. This yield was calculated as 66% of theoretical.

The reaction product was subjected to analysis, and the results were as follows:

Calculated: C, 63.16; H, 7.18; N, 6.70. Analyzed: C, 63.18, 63.34; H, 7.18, 7.34; N, 6.53; 6.72.

Example X

The following method was utilized in the preparation of 2-hydroxy-2-phenylethyl-N-amino carbamate:

The benzene-soluble fraction obtained according to the method of Example I was mixed with 220 ml. of hydrazine hydrate, and the resulting mixture was maintained at a temperature of 5° C. for a period of 3 hours. The white precipitate thereupon formed was separated by filtration and recrystallized from ethanol to yield 23.5 gms. of reaction product having a melting point of 156–9° C. This yield was calculated as 40% of theoretical.

The reaction product was subjected to analysis, and the results were as follows:

Calculated: C, 55.10; H, 6.12; N, 14.28. Analyzed: C, 55.05, 54.85; H, 6.21, 6.22; N, 14.47, 14.42.

Example XI

The following method was utilized in the preparation of 1-phenylethyl-1,2 dicarbamate:

A solution of 32.0 gms. (0.3 mole) of phosgene in 200 ml. of benzene was added dropwise to a stirred solution of 54.3 gms. of 2-hydroxy-2-phenylethyl carbamate (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water.

To the washed benzene layer was added 500 ml. of a 30% aqueous ammonium hydroxide solution, and thereafter the resulting mixture was maintained at a temperature of 5° C. for a period of 3 hours. The white precipitate thereupon formed was separated from the mother liquor and recrystallized from chloroform containing a minor portion of acetone. The yield of crystalline product was 10 gms. having a melting point of 166–7° C.

This reaction product was subjected to analysis, and the results were as follows:

Calculated: C, 53.57; H, 5.36; N, 12.5. Analyzed: C, 53.59, 53.40; H, 5.56, 5.41; N, 12.54, 12.40.

Example XII

The following method was utilized in the preparation of 2-phenylethyl carbamate:

A solution of 32.0 gms. (0.3 mole) of phosgene in 200 ml. of benzene was added dropwise to a stired solution of 39.0 gms. of betaphenylethyl alcohol (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture was stirred for an additional hour. About 500 ml. of ice water was then added to the flask, and the benzene layer thereupon formed separated from the aqueous layer and washed with an additional 500 ml. of ice water.

To the washed benzene layer was added 500 ml. of a 30% aqueous ammonium hydroxide solution, and thereafter the resulting mixture was maintained at a temperature of 5° C. for a period of 3 hours. The precipitate thereupon formed was separated from the mother liquor. The yield of solid was 35.2 gms. An additional amount of reaction product was recovered from this mother liquor. The combined yield, after recrystallization from chloroform, was 32.8 gms. The melting point of the reaction product was 91–91.5° C.

This reaction product was subjected to analysis and the results were as follows:

Calculated: C, 65.45; H, 6.66; N, 8.48. Analyzed: C, 65.31, 65.60; H, 6.66, 6.72; N, 8.31, 8.38

Example XIII

The following method was utilized in the preparation of 2-hydroxy-2-phenylpropyl carbamate:

2-phenylpropylene carbonate, in the amount of 10.0 gms., was mixed with 200 ml. of a concentrated aqueous ammonium hydroxide solution. The resulting mixture was heated for a period of 1 hour on a steam bath. The excess ammonium and water were separated from the reaction product under reduced pressure. The separated reaction product, which was of the consistency of an oil, was fractionated by distillation. The resulting product, which was obtained in a yield of 5.15 gms., had a boiling point of 160–167° C.

Example XIV

The following method was utilized in the preparation of 2-hydroxy-2-2-diphenylethyl carbamate:

1,1-diphenylethylene carbonate, in the amount of 10 gms., was mixed with 200 ml. of a concentrated aqueous ammonium hydroxide solution. The resulting mixture was heated for a period of 1 hour on a steam bath. The solvent was separated from the reaction product under reduced pressure, and the separated reaction product was crystallized from chloroform. The crystallized reaction product, which was obtained in a yield of 5.9 gms., had a melting point of 169–170° C.

Example XV

The following method was utilized in the preparation of N,N-dimethyl-2,2-diphenyl-2-hydroxyethyl carbamate:

1,1-diphenylethylene carbonate, in the amount of 5 gms., was mixed with 100 ml. of an aqueous 40% dimethylamine solution. The resulting mixture was heated on a steam bath for a period of 1 hour. The reaction mixture was then cooled, and the reaction product separated from residual liquid by filtration. The separated reaction product was obtained in a yield of 5.6 gms. This product was crystallized from chloroform to provide a substance having a melting point of 127–129° C.

Example XVI

The following method was utilized in the preparation of N,N-dimethyl-2,2-diphenyl-2-hydroxyethyl carbamate:

A solution of 32 gms. of phosgene in 200 ml. of benzene was added, drop-wise, to a stirred solution of 69 gms. of 1,1-diphenyl-1,2-ethanediol in 600 ml. of benzene. These solutions were maintained at a temperature of 30° C. during the addition step.

The resulting reaction mixture was stirred for a period of 45 minutes, and then 48 gms. of diethylaniline in 100 ml. of benzene was added thereto while maintaining such mixture at a temperature of less than 40° C. This mixture was then stirred for an additional 2½ hours. Thereafter, about 500 ml. of ice water was added to the flask, and the benzene layer thereupon formed was separated from the aqueous layer and washed with an additional 500 ml. of ice water.

To the washed benzene solution was added 500 ml. of an aqueous 40% dimethylamine solution, while maintaining the solutions at a temperature of less than 10° C. The resulting mixture was warmed overnight to room temperature, whereupon no solid was formed in the flask.

The two layers of solution in the flask were separated, and the benzene layer was concentrated under reduced pressure. The reaction product was obtained as a white solid, and recrystallized from chloroform. This crystallized product, which was obtained in a yield of 77 gms., had a melting point of 128–129° C.

The diethylaniline reactant utilized in this process is a base acceptor. Other teritary amines, such as triethylamine, can be utilized to remove hydrochloric acid from the reaction mixture.

Example XVII

In summarizing, there have been prepared and utilized in this central nervous system treatment, by the methods described in the foregoing examples, organic carbamate compounds having the following structure:

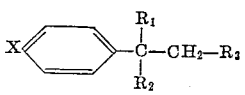

| R₁ | R₂ | R₃ | X |
|---|---|---|---|
| OH | H | OH | Cl |
| OH | H | O—C(=O)—NH₂ | |
| H | H | O—C(=O)—NH₂ | |
| OCH₃ | H | O—C(=O)—NH₂ | |
| OC(=O)CH₃ | H | O—C(=O)—NH₂ | |
| OH | CH₃ | O—C(=O)—NH₂ | |
| OH | C₂H₅ | O—C(=O)—NH₂ | |
| OH | C₃H₇ | O—C(=O)—NH₂ | |
| OH | Phenyl | O—C(=O)—NH | Cl |
| OH | Phenyl | O—C(=O)—N—CH₃ | |
| OH | H | O—C(=O)—NCH₃ | |
| OH | H | O—C(=O)—N(CH₃)₂ | |
| OH | H | O—C(=O)—N=NH | |

While in the foregoing specification various aspects of this invention have been set forth and specific details thereof elaborated for the purpose of illustration, it will be apparent to those skilled in the art that this invention is susceptible to other aspects and that many of these details can be varied widely without departing from the basic concept and spirit of the invention.

We claim:

1. The method of inducing calming and muscle relaxation in a human being which comprises administering a chemical compound having the formula

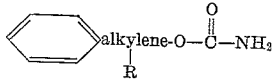

in which alkylene is a saturated alkylene chain of from 2 to 4 carbon atoms and R is a member selected from the group consisting of hydrogen and alkyl of from 1 to 3 carbon atoms.

2. The method of inducing a calming effect in an animal comprising the administration to said animal the organic carbamate compound 1-phenylethyl carbamate.

3. The method of inducing a calming effect in an animal comprising the administration to said animal the organic carbamate compound 2-phenylethyl carbamate.

References Cited by the Examiner

UNITED STATES PATENTS

| | | | |
|---|---|---|---|
| 2,656,378 | 10/1953 | Berger et al. | 260—482 |
| 2,724,720 | 11/1955 | Berger et al. | 260—482 |
| 2,798,885 | 7/1957 | Ensslin | 167—52 |
| 2,878,158 | 3/1959 | Stuehmer | 167—52.7 |
| 2,884,444 | 4/1959 | Berger | 167—65 |

OTHER REFERENCES

Berger: J. Pharm. & Exp. Ther. 104, p. 230, 1952.

Charlier: Arch. Int. Pharmacodyn., vol. 112, No. 3–4, Nov. 1, 1957, pp. 463–465, 483–484.

SAM ROSEN, *Primary Examiner.*

M. O. WOLK, *Examiner.*

PAUL L. SABATINE, T. LEFCO, *Assistant Examiners.*